US009509170B2

United States Patent
Wu

(10) Patent No.: US 9,509,170 B2
(45) Date of Patent: Nov. 29, 2016

(54) STEERING WHEEL AND CAR USING THE STEERING WHEEL

(71) Applicant: HON HAI PRECISION INDUSTRY CO., LTD., New Taipei (TW)

(72) Inventor: Chia-Ching Wu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 201 days.

(21) Appl. No.: 14/308,957

(22) Filed: Jun. 19, 2014

(65) Prior Publication Data

US 2014/0375259 A1    Dec. 25, 2014

(51) Int. Cl.
| | | |
|---|---|---|
| H02J 7/00 | (2006.01) |
| H02J 5/00 | (2016.01) |
| H02J 9/00 | (2006.01) |
| B60R 16/03 | (2006.01) |
| H01F 21/02 | (2006.01) |
| H01F 21/04 | (2006.01) |
| H01F 21/06 | (2006.01) |
| H01F 27/36 | (2006.01) |
| H02J 7/02 | (2016.01) |

(52) U.S. Cl.
CPC .............. *H02J 7/025* (2013.01); *B60R 16/03* (2013.01); *H02J 5/005* (2013.01); *H01F 21/02* (2013.01); *H01F 21/04* (2013.01); *H01F 21/06* (2013.01); *H01F 27/36* (2013.01); *H02J 9/00* (2013.01)

(58) Field of Classification Search
CPC ............ H02J 7/025; H02J 5/005; H02J 9/00; B60R 16/03; H01F 21/02; H01F 21/04; H01F 21/06; H01F 27/36

USPC ......... 320/108, 114; 336/15, 84 R, 115, 130; 307/150

See application file for complete search history.

(56) References Cited

U.S. PATENT DOCUMENTS

2007/0132453 A1* 6/2007 Ogino .................. G01R 33/341
324/318
2011/0241440 A1* 10/2011 Sakoda ................... H02J 5/005
307/104

(Continued)

FOREIGN PATENT DOCUMENTS

| CN | 202641808 U | | 1/2013 |
| JP | 2004273397 A | * | 9/2004 |
| JP | 2010098807 A | * | 4/2010 |

OTHER PUBLICATIONS

Rouse et al., Electromagnetic Interference (EMI), http://searchmobilecomputing.techtarget.com/definition/electromagnetic-interference, first published in Mar. 2010, 5 pages.*

*Primary Examiner* — Phallaka Kik
(74) *Attorney, Agent, or Firm* — Zhigang Ma

(57) ABSTRACT

A car representing an electrical power source includes a car body and a steering wheel, and the steering wheel can recharge the battery of a portable electronic device within close proximity. The steering wheel includes a rim and an emitting module. The emitting module includes an emitting coil and a shielding layer covering the emitting coil. The emitting coil is electrically powered from the car and configured to convert AC power to electromagnetic waves of specific frequency and emit the electromagnetic waves to the receiving module of the electronic device, such that the receiving module receives and converts the electromagnetic waves to electrical power to charge the battery of the electronic device. The present disclosure further provides a car and a wireless charging system.

12 Claims, 4 Drawing Sheets

(56) References Cited

U.S. PATENT DOCUMENTS

| | | | | |
|---|---|---|---|---|
| 2013/0181535 A1* | 7/2013 | Muratov | | H01F 38/14 307/104 |
| 2013/0285604 A1* | 10/2013 | Partovi | | H02J 7/0042 320/108 |
| 2014/0029233 A1* | 1/2014 | Yanagida | | B60L 11/182 361/818 |
| 2014/0176262 A1* | 6/2014 | Bang | | H01P 1/2039 333/204 |
| 2014/0340035 A1* | 11/2014 | Maekawa | | H01F 38/14 320/108 |

* cited by examiner

STEERING WHEEL AND CAR USING THE STEERING WHEEL

FIELD

The subject matter herein generally relates to automotive engineering.

BACKGROUND

A car can be equipped with a steering wheel and a driver can hold the steering wheel. The driver can have an electronic device including rechargeable batteries, for example a watch on wrist of the driver. When a battery of the watch runs out, the watch needs to be taken off from wrist of the driver and charged via an adapter in the car. The driver must use his hands to do this.

BRIEF DESCRIPTION OF THE DRAWINGS

Implementations of the present technology will now be described, by way of example only, with reference to the attached figures, wherein.

DETAILED DESCRIPTION

Figure 1:
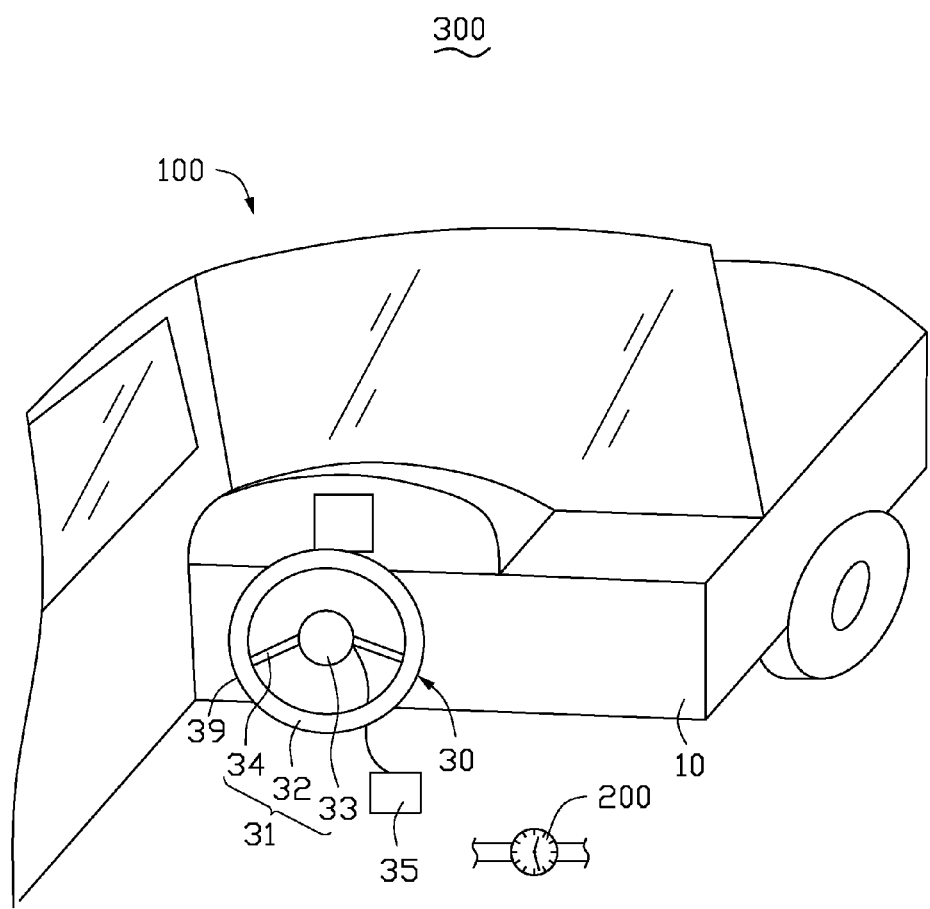
FIG. 1 is a view of the interior of a car and a portable electronic device, the car including a steering wheel.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is in relation to a car for charging an electronic device having a receiving module. The car includes a car body and a steering wheel. The steering wheel includes a rim and an emitting module. The emitting module includes an emitting coil and a shielding layer covering the emitting coil and attached to the rim. The emitting coil is electrically coupled to an electrical power supply. The emitting coil is configured to convert an alternating current (AC) to electromagnetic wave of specific frequency and emit the electromagnetic wave to the receiving module, such that the receiving module is capable of receiving the electromagnetic wave and converting the electromagnetic wave to electrical power to charge the electronic device.

FIG. 1 illustrates a car 100 (partially shown in FIG. 1) which can include a car body 10 and a steering wheel 30 to steer the car 100. The steering wheel 30 and a portable electronic device 200 in the car 100 can cooperatively define a wireless charging system 300. The wireless charging system 300 can provide a recharging electricity to the portable electronic device 200. In the illustrated embodiment, the portable electronic device 200 can be a watch. In an alternative embodiment, the portable electronic device 200 can be other rechargeable devices, for example a mobile phone or an MP3 player. The car 100 can include other structures, but introductions of the other well-known structures are omitted.

Figure 2:
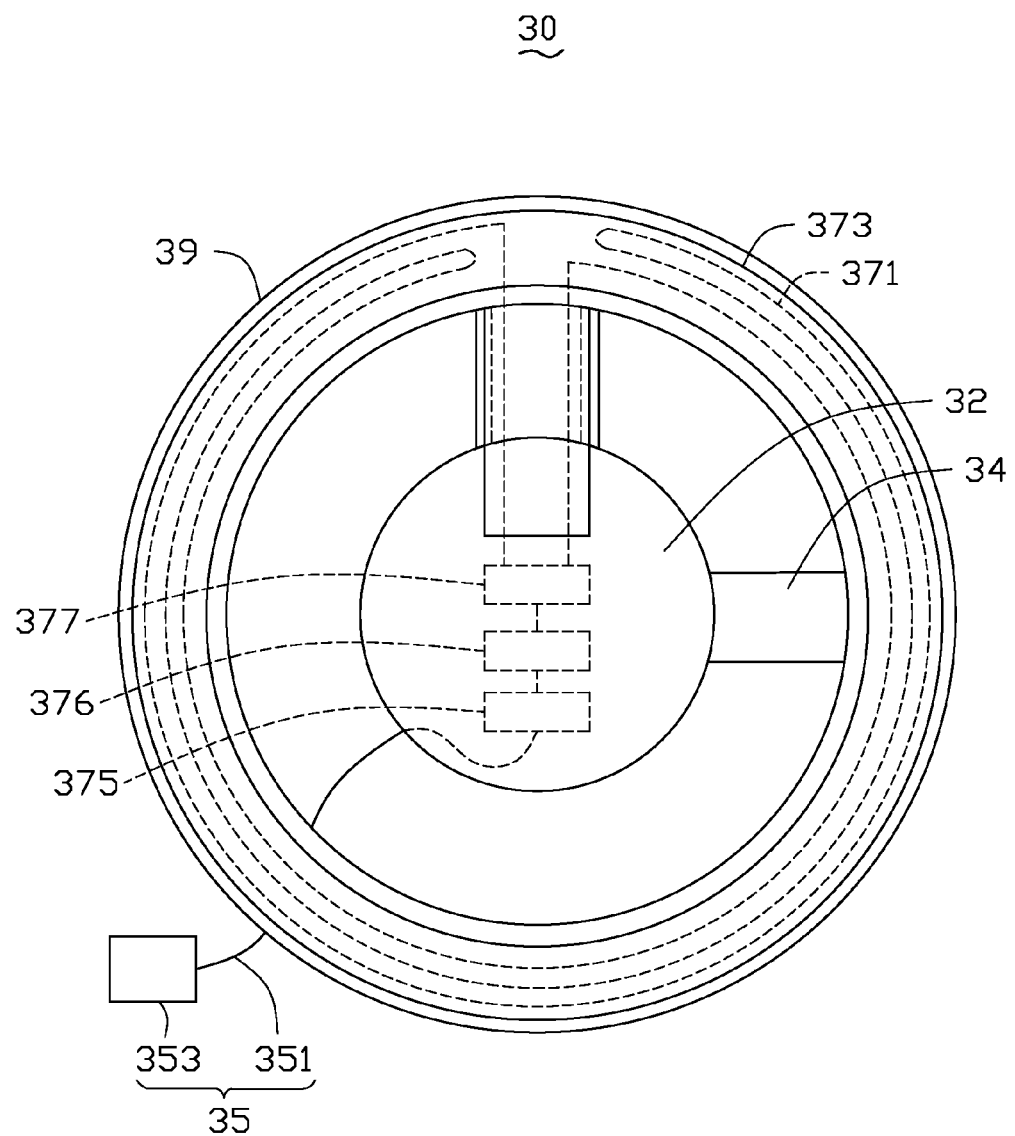
FIG. 2 is a top plan view of the steering wheel in FIG. 1.
Figure 4:
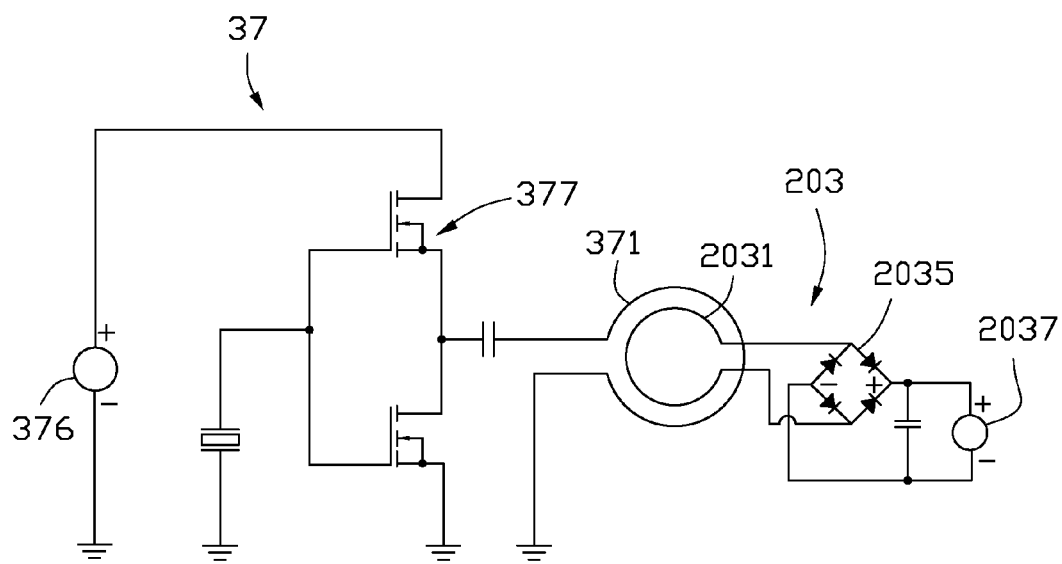
FIG. 4 is a circuit diagram of the components in the steering wheel in FIG. 1.

Referring to FIGS. 1, 2, and 4, the steering wheel 30 can include a base body 31, an electrical power source 35, an emitting module 37, and an insulated protection layer 39. The base body 31 can be coupled to a steering shaft (not shown) of the car 100. The emitting module 37 can be received in the base body 31 and electrically coupled to the electrical power source 35. The insulated protection layer 39 can cover the base body 31, to prevent electrical leakage. The base body 31 can include a rim 32, a wheel hub 33, and two wheel arms 34. The rim 32 can be substantially circular. The wheel hub 33 can be coaxially positioned with the rim 32 and coupled to the car body 10. The wheel arms 34 are separately located between the rim 32 and the wheel hub 33. Each wheel arm 34 couples the rim 32 and the wheel hub 33.

The electrical power source 35 can be electrically connected to the emitting module 37. The electrical power source 35 can include a conducting wire 351 and an electrical terminal 353 electrically coupled to the conducting wire 351. The conducting wire 351 can be electrically coupled to the emitting module 37. The electrical terminal 353 can be coupled to a cigarette lighter socket (not shown) of the car 100 to obtain electricity from the cigarette lighter. Electricity can flow to the emitting module 37 via the conducting wire 351.

The emitting module 37 can include an emitting coil 371, a shielding layer 373, a flexible printed circuit (FPC) connecting pin 375, a direct current (DC) power input terminal 376, and a resonator 377. The emitting coil 371 can be formed on a side of the shielding layer 373 via electroplating or soldering. The emitting coil 371 can be attached on the rim 32. The shielding layer 373 can cover the emitting coil 371 and be attached on the rim 32. In the illustrated embodiment, the shielding layer 373 can be flexible board. The emitting coil 371 can include a plurality of windings. The emitting coil 371 can be substantially circular. A size of a periphery of the emitting coil 371 can be less than that of the shielding layer 373.

The FPC connecting pin 375, the DC power input terminal 376, and the resonator 377 can be received in the wheel hub 33. The DC power input terminal 376 can be located and electrically coupled between the FPC connecting pin 375 and the resonator 377. The FPC connecting pin 375 can be electrically coupled to the conducting wire 351 to obtain electricity from the electrical power source 35. Thus, electricity can be conducted to the DC power input terminal 376. The resonator 377 can be electrically coupled to the emitting coil 371 via wires passing through the wheel arms 34. The resonator 377 can convert DC power of the DC power input terminal 376 into AC power, and then output the AC power to the emitting coil 371. The emitting coil 371 can emit electromagnetic waves of particular specific frequencies. The insulated protection layer 39 can cover an outer surface of the rim 32, the wheel hub 33, and the wheel arms 34, to reduce electrical leakage.

Figure 3:
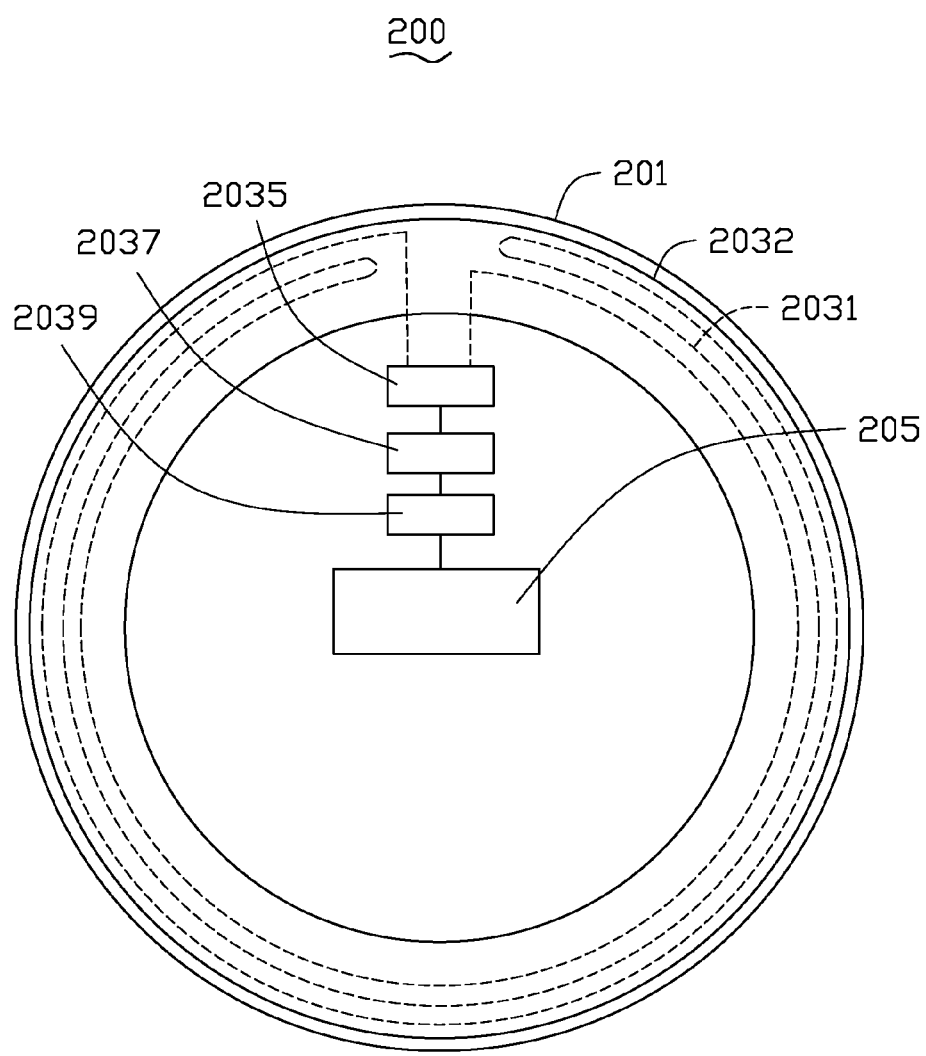
FIG. 3 is a top plan view of the portable electronic device in FIG. 1.

Referring to FIGS. 3 and 4, the wireless charging system 300 can include the steering wheel 30 and the portable electronic device 200. A partial structure of the portable electronic device 200 can be similar to a partial structure of the steering wheel 30. The portable electronic device 200 can include a main body 201, a receiving module 203 received in the main body 201, and a rechargeable battery 205.

The receiving module 203 can include a receiving coil 2031, a shielding layer 2032, a rectifier 2035, a DC power output terminal 2037, and an FPC connecting pin 2039. The shielding layer 2032 can cover the receiving coil 2031. The shielding layer 2032 can be attached on the main body 201. In the illustrated embodiment, the receiving coil 2031 can be formed on a side of the shielding layer 2032 via electroplating or soldering. The receiving coil 2031 can be attached on the main body 201. The shielding layer 2032 can be a flexible board. The receiving coil 2031 can include many windings and configured to be coupled to the receiving coil 371 to receive electrical power. The receiving coil 2031 can be substantially circular. A size of a periphery of the receiving coil 2031 can be less than that of the shielding layer 2032. The rectifier 2035, the DC power output terminal 2037, and the FPC connecting pin 2039 can be received in the main body 201. The DC power output terminal 2037 can be located and electrically coupled between the FPC connecting pin 2039 and the rectifier 2035. The rectifier 2035 can be electrically coupled to the receiving coil 2031, to convert AC power received into DC power and output the DC power to the DC power output terminal 2037. The DC power output terminal 2037 can conduct the DC power to the FPC connecting pin 2039. The FPC connecting pin 2039 can be electrically coupled to the rechargeable battery 205. Thus, DC power can be fed to the rechargeable battery 205 via the FPC connecting pin 2039 to recharge the battery 205.

When operating the steering wheel 30, the emitting coil 371 can emit electromagnetic waves of particular specific frequencies. The receiving coil 2031 can receive the electromagnetic wave and convert the electromagnetic wave to DC power to charge the rechargeable battery 205 of the portable electronic device 200.

In an alternative embodiment, the wheel arms 34 can be one or more than two. The insulated protection layer 39 can be omitted and then the shielding layer 373 can be made of insulating materials. The FPC connecting pin 375, the DC power input terminal 376, and the resonator 377 can be omitted. Then the emitting coil 371 can emit electromagnetic waves to the receiving module 203. The receiving module 203 can receive the electromagnetic wave and convert the electromagnetic wave to DC power to charge the rechargeable battery 205 of the portable electronic device 200. The electrical power source 35 can be replaced by an external power source or by an inner power source received in the car 100. When the portable electronic device 200 is a mobile phone, the receiving coil 2031 can be located around an outer frame of the mobile phone.

The embodiments shown and described above are only examples. Many details are often found in the art such as the other features of a steering wheel. Therefore, many such details are neither shown nor described. Even though numerous characteristics and advantages of the present technology have been set forth in the foregoing description, together with details of the structure and function of the present disclosure, the disclosure is illustrative only, and changes can be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A steering wheel configured to charge an electronic device having a receiving module, comprising:
   a rim;
   a wheel hub coaxially positioned with the rim;
   an emitting module comprising:
      an emitting coil comprising a plurality of windings being arranged on the rim;
      a flexible printed circuit (FPC) connecting pin received in the wheel hub and electrically coupled to an electrical power source to obtain electrical power;
      a direct current (DC) power input terminal received in the wheel hub and electrically coupled to the FPC connecting pin;
      a resonator received in the wheel hub and respectively electrically coupled to the DC power input terminal and the emitting coil; and
      a shielding layer covering the emitting coil and being attached to the rim;
   wherein the DC power input terminal obtains electrical power from the FPC connecting pin and transmit the electrical power to the resonator, the resonator is configured to convert direct current power of the DC power input terminal into alternating current power (AC power), and then output the AC power to the emitting coil, the emitting coil is configured to convert the AC power to electromagnetic waves of specific frequencies and emit the electromagnetic wave to the receiving module; the receiving module is capable of receiving the electromagnetic waves and converting the electromagnetic waves to electrical power to charge the electronic device.

2. The steering wheel of claim 1, wherein the electrical power source comprises a conducting wire and an electrical terminal electrically coupled to the conducting wire; and the FPC connecting pin can be electrically coupled to the conducting wire.

3. The steering wheel of claim 1, wherein a size of a periphery of the emitting coil is less than that of the shielding layer.

4. The steering wheel of claim 1 further comprising an insulated protection layer, wherein the insulated protection layer covers the rim.

5. The steering wheel of claim 1, wherein the emitting coil is formed on a side of the shielding layer via electroplating or soldering.

6. The steering wheel of claim 1, wherein the shielding layer is flexible board.

7. A car comprising:
   a car body
   a wheel hub coaxially positioned with the rim;

a steering wheel configured to charge an electronic device having a receiving module, the steering wheel comprising:
a rim;
an emitting module comprising:
an emitting coil comprising a plurality of windings being arranged on the rim;
a flexible printed circuit (FPC) connecting pin received in the wheel hub and electrically coupled to an electrical power source to obtain electrical power;
a direct current (DC) power input terminal received in the wheel hub and electrically coupled to the FPC connecting pin;
a resonator received in the wheel hub and respectively electrically coupled to the DC power input terminal and the emitting coil; and
a shielding layer covering the emitting coil and being attached to the rim;
wherein the DC power input terminal obtains electrical power from the FPC connecting pin and transmit the electrical power to the resonator, the resonator is configured to convert direct current power of the DC power input terminal into alternating current power (AC power), and then output the AC power to the emitting coil, the emitting coil is configured to convert the AC power to electromagnetic waves of specific frequencies and emit the electromagnetic wave to the receiving module; the receiving module is capable of receiving the electromagnetic waves and converting the electromagnetic waves to electrical power to charge the electronic device.

8. The car of claim 7, wherein the electrical power source comprises a conducting wire and an electrical terminal electrically coupled to the conducting wire, the FPC connecting pin can be electrically coupled to the conducting wire.

9. The car of claim 7, wherein a size of a periphery of the emitting coil is less than that of the shielding layer.

10. The car of claim 7, wherein the steering wheel further comprises an insulated protection layer, the insulated protection layer covers the rim.

11. The steering wheel of claim 7, wherein the emitting coil is formed on a side of the shielding layer via electroplating or soldering.

12. The steering wheel of claim 7, wherein the shielding layer is flexible board.

* * * * *